United States Patent [19]

Waltman

[11] Patent Number: 4,593,613
[45] Date of Patent: Jun. 10, 1986

[54] ROTISSERIE

[76] Inventor: John H. Waltman, 3336 Bald Mountain Rd., Pontiac, Mich. 48057

[21] Appl. No.: 757,679

[22] Filed: Jul. 22, 1985

Related U.S. Application Data

[63] Continuation-in-part of Ser. No. 531,031, Sep. 12, 1983, Pat. No. 4,505,195.

[51] Int. Cl.⁴ .............................................. A47J 37/04
[52] U.S. Cl. ......................................... 99/427; 99/449
[58] Field of Search ......... 99/421 R, 421 HV, 421 V, 99/426, 427, 449; 279/114; 74/523, 525, 533, 534, 541; 49/363, 404; 405/103–106; 222/505

[56] References Cited

U.S. PATENT DOCUMENTS

| | | | |
|---|---|---|---|
| 540,649 | 6/1895 | Eastwood | 279/114 |
| 779,128 | 1/1905 | Mummey et al. | 222/505 X |
| 1,853,319 | 4/1932 | Polhemus | 99/421 HV X |
| 1,993,607 | 3/1935 | Kalgren | 99/427 X |
| 2,046,352 | 7/1936 | Warner | 99/421 HV |
| 2,297,825 | 10/1942 | Bobo . | |
| 2,505,976 | 5/1950 | Leon | 99/421 HV |
| 2,638,841 | 5/1953 | Boyce | 99/427 X |
| 2,839,989 | 6/1958 | Persinger | 99/421 R |
| 2,938,450 | 5/1960 | Carpenter et al. | 99/427 |
| 3,103,161 | 9/1963 | Whitehead | 99/427 |
| 3,344,736 | 10/1967 | Myler et al. | 99/421 HV |
| 3,563,159 | 2/1971 | Johnson | 99/339 |
| 3,797,379 | 3/1974 | Brion | 99/421 H |
| 4,222,577 | 9/1980 | Giffin | 279/114 |

FOREIGN PATENT DOCUMENTS 1947386 3/1971 Fed. Rep. of Germany ........ 49/363

Primary Examiner—Billy J. Wilhite
Attorney, Agent, or Firm—Basile, Weintraub & Hanlon

[57] ABSTRACT

A rotisserie is disclosed which includes a pair of supporting frames that rotatably support a cradle that has means for vertically adjusting the opposite ends of the rotating cradle so that the position of the cradle with respect to a source of heat may be varied. In the selected embodiment the cradle comprises a pair of end plates with a plurality of rods extending between the end plates for securing food to be cooked thereto and in which a selected number of the rods may be moved radially inward to clamp the food in position.

15 Claims, 11 Drawing Figures

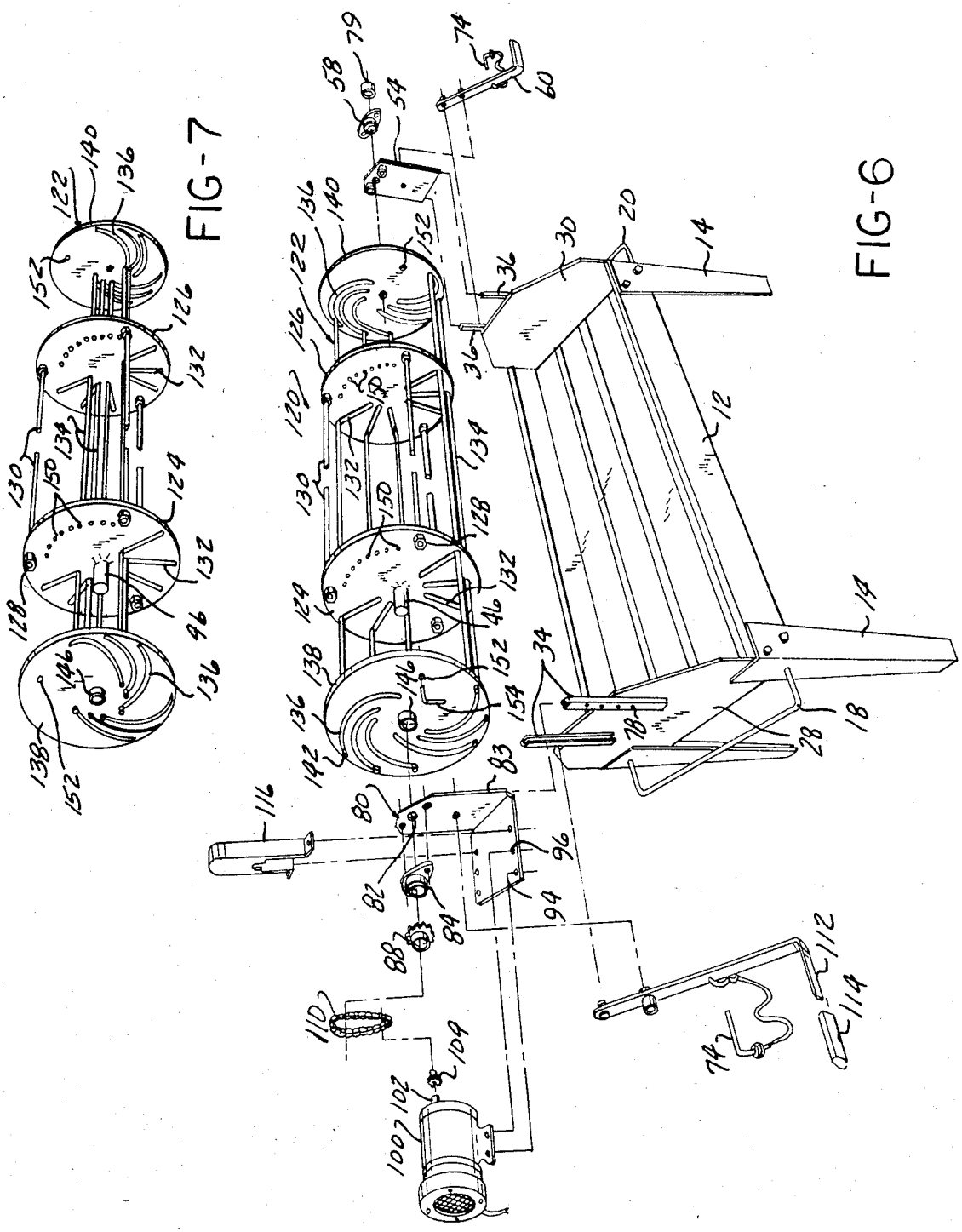

ROTISSERIE

CROSS REFERENCE TO RELATED APPLICATIONS

This application is a continuation-in-part of co-pending U.S. patent application Ser. No. 531,031 filed Sept. 12, 1983, for a "ROTISSERIE" and now U.S. Pat. No. 4,505,195 issued Mar. 19, 1985.

BACKGROUND OF THE INVENTION

I. Field of the Invention

The present invention relates to rotisseries and, in particular, to a barbeque apparatus in which food is adapted to be mounted and rotated above a source of heat.

II. Description of the Prior Art

In the prior art, food, such as a meat to be grilled, is generally placed on a spit which is rotatable to expose the meat to the heat in order to ensure uniform cooking of the same. In cooking large meats, such as a pig roast or a large side of beef, the spit may not be capable of rotatably supporting the meat to be grilled because of its shape. In many situations the spit is provided with forks that are carried by the spit and which pierce the opposite ends of the meat; however, after a considerable amount of rotation of the spit, the forks sometimes break loose of the meat and the meat fails to rotate, thus causing uneven heating and cooking of the same. In many applications the rotisseries are used in association with an outdoor barbeque pit in which charcoal is utilized as the means for heating the meat. In many situations it is difficult to control the temperature of the charcoal and it would be desirable to provide a means for adjusting the height of the meat with respect to the charcoal so as to control the rate at which the meat is cooked.

Many of the prior art devices suggest a variety of means for overcoming certain of the aforementioned problems. For example, U.S. Pat. Nos. 3,563,159 and 2,938,450 each disclose a rotatable cage member having a circular cross section which includes a concentric spit for mounting an animal or piece of meat thereon. The cage is rotatable about an underlying support stand.

U.S. Pat. No. 2,839,989 discloses a barbeque attachment having a rectangular cross section which includes a spit running therethrough for receiving objects thereon for barbequing.

U.S. Pat. Nos. 1,993,607 and 3,103,161 are considered relevant to the present invention as disclosing rotatable barbeque apparatuses including cages having a circular or rectangular configuration, respectively. Other prior art patents of which applicant is aware include U.S. Pat. Nos. 2,297,825, 3,344,736 and 3,797,379. These patents show other types of barbequing apparatuses which include means for supporting meat to be cooked for barbequing in which the apparatuses are rotatable above an underlying fire.

Other relevant art includes German Pat. No. 1,947,386 and U.S. Pat. No. 779,128.

None of the prior art patents disclose a barbeque or rotisserie which completely overcomes the aforementioned problems in that a simple means is provided for rotating the meat to be cooked at selected and varying heights from the open fire while the same is being rotated, nor do any of the prior art patents show a simple and effective means for securing the meat to the cradle which carries it above the open fire.

SUMMARY OF THE INVENTION

The present invention, which will be described in greater detail hereinafter, comprises a rotisserie that includes a cradle that is rotated at the proper speed by an electric motor above a source of heat. The cradle has a plurality of longitudinally disposed rod members that support the meat to be cooked while the cradle itself is rotatably supported at its opposite ends in such a manner that its opposite ends may be raised or lowered so that the cradle may rotate about an axis that may be inclined with respect to the horizontal whereby the distance of the meat from the open flame may be selectively varied, depending upon the desired rate of cooking. In a second, preferred embodiment the longitudinal members of the cradle may be selectively positioned at radial distances from the axis of rotation to clamp the meat to be cooked within the cradle.

In a third embodiment of the invention, the selectively positional cradle is provided with a unique means for securing within the cradle the food to be cooked.

It is therefore an object of the present invention to provide a rotisserie which is simple in its construction yet one which provides for the easy mounting of the meat to be cooked, and in which the rate at which the meat is cooked can be simply controlled by adjusting the position of the meat with respect to the source of heat.

It is another object of the present invention to provide a rotisserie which has a simple means for securing the meat to be cooked to the rotisserie.

It is a further object of the present invention to provide a rotisserie of the foregoing character which is of a simple construction and easy to manufacture and assemble.

Other objects, advantages and applications of the present invention will become apparent to those skilled in the art of rotisseries when the following description of the best modes contemplated for practicing the invention are read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 6 is an exploded, perspective view of the rotisserie illustrated in FIG. 4;

FIG. 7 is an exploded, perspective view of the cradle illustrated in FIG. 6 with the cradle rods being illustrated in a radially inward position;

DESCRIPTION OF THE PREFERRED EMBODIMENTS

Figure 1:
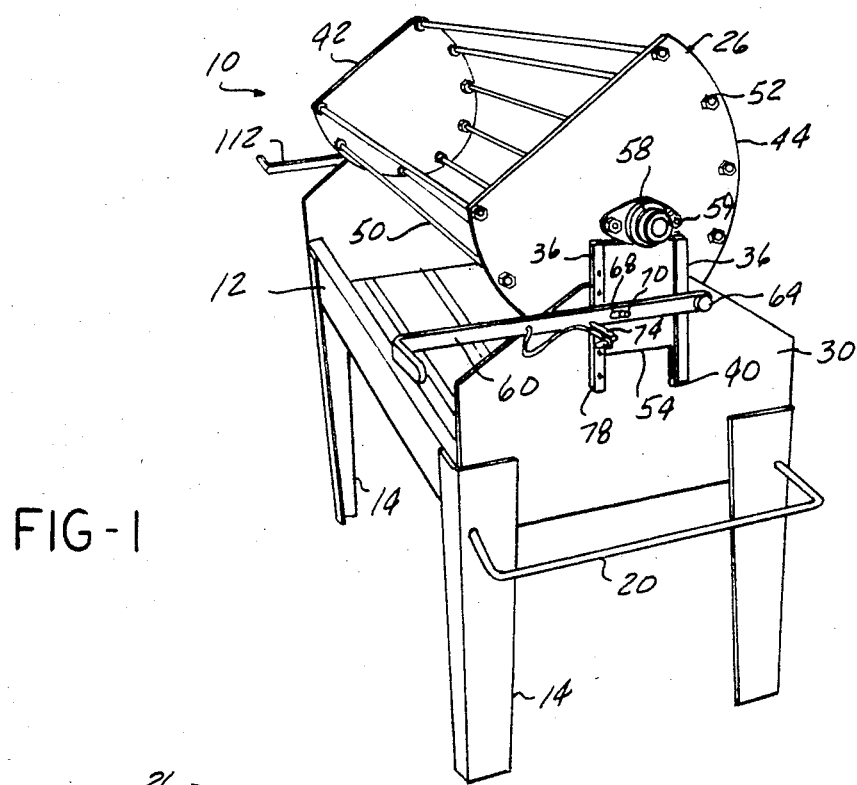
FIG. 1 is a perspective view of the right end of one example of the present invention in the form of a rotisserie.
Figure 2:
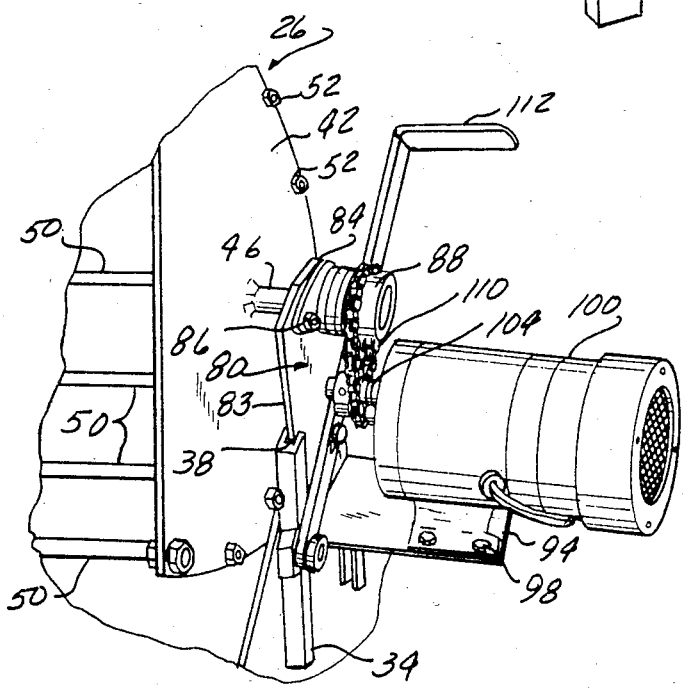
FIG. 2 is a fragmentary, perspective, rear view of the left end of the rotisserie illustrated in FIG. 1.
Figure 3:
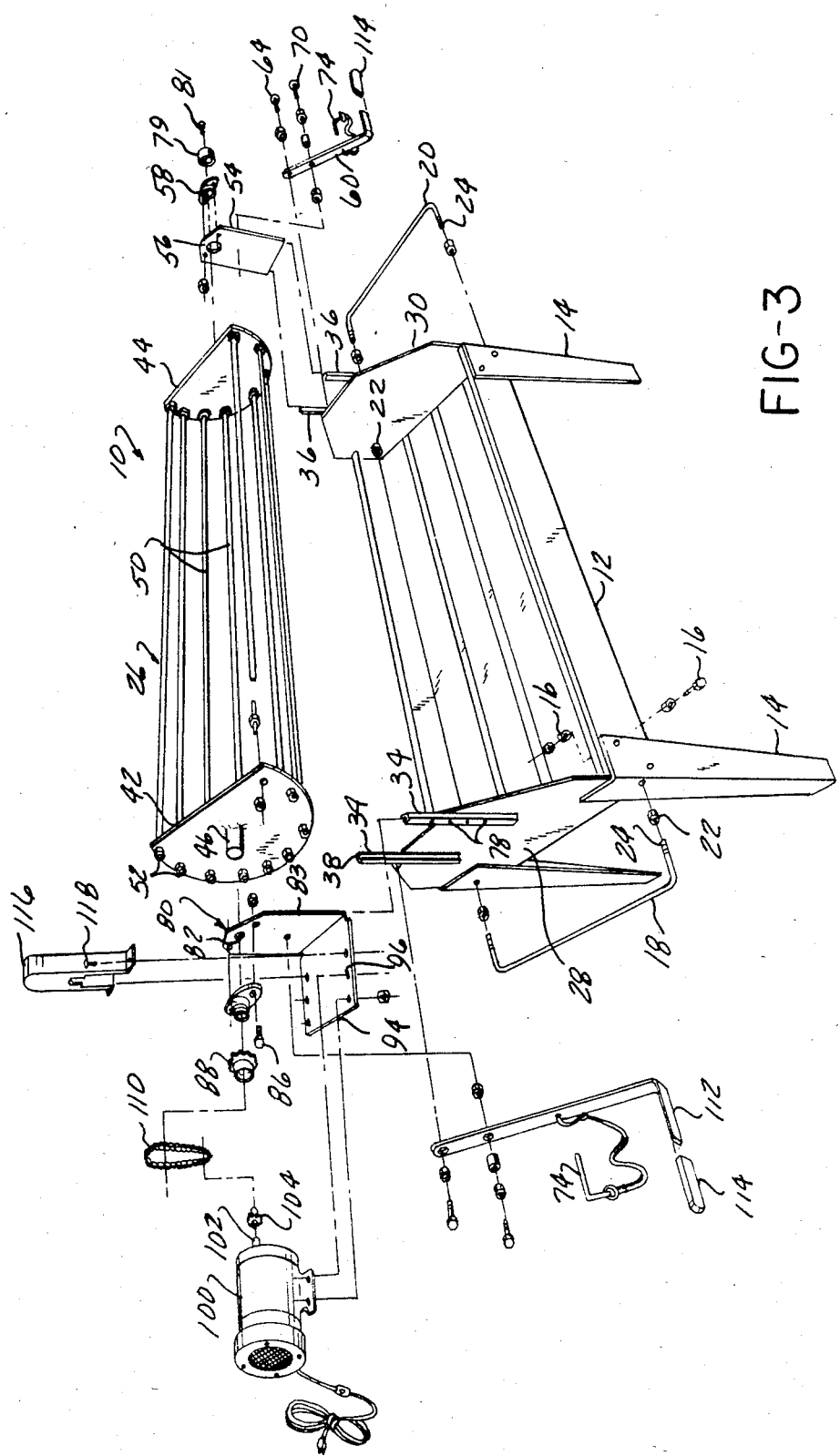
FIG. 3 is an exploded, perspective view of the left end of the rotisserie illustrated in FIG. 1.

Referring now to FIGS. 1, 2 and 3, there is illustrated one example of the present invention in the form of a rotisserie 10 which comprises a grill pan 12 supported by end legs 14. The end legs 14 are attached to the four corners of the grill pan 12 by any suitable means, such as by nut and bolt assemblies 16 (FIG. 3). A pair of grill pan handles 18 and 20 are attached to the opposite longitudinal ends of the grill pan 12 by a suitable fastening means, such as nuts 22, which are received on the threaded ends 24 of the grill pan handles 18 and 20. The grill pan handles 18 and 20 provide a simple means for lifting and moving the rotisserie 10. The rotisserie 10 further comprises a cooking cradle 26 which is attached to the grill pan 12 in a manner that will be described hereinafter. The grill pan 12 further comprises end plate assemblies 28 and 30 which are secured to the grill pan 12 by suitable fastening means. In the present embodiment the grill pan handles 18 and 20 extend through the grill pan end plate assemblies 28 and 30, respectively, and secure them to the grill pan 12. Each of the end plate assemblies 28 and 30 has vertically disposed U-shaped legs 34 and 36 which define opposing slots 38 (FIG. 2) and 40 (FIG. 8) respectively.

Figure 8:
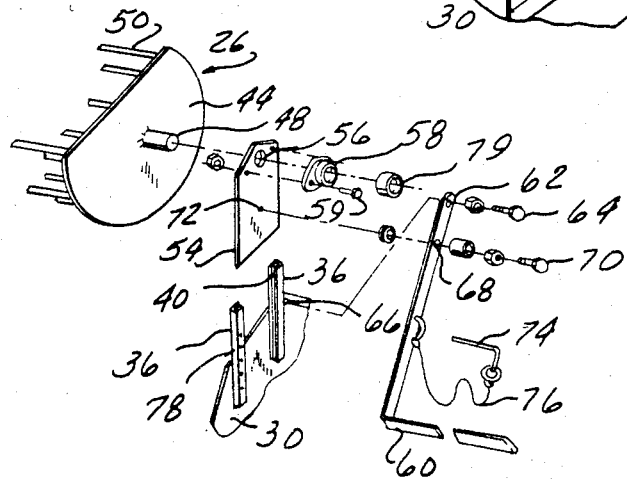
FIG. 8 is a fragmentary, exploded, perspective view of the right end of FIG. 1.

As can best be seen in FIG. 3, the cradle 26 comprises a pair of spindle end plates 42 and 44, each of which respectively has a longitudinal extending shaft 46 and 48 (see FIG. 8). The shaft 46 is provided with a longitudinal slot, the purpose of which will be described hereinafter.

Each of the end plates 42 and 44 has a plurality of circumferentially spaced apertures disposed along the periphery thereof which are adapted to receive the opposite threaded ends of a plurality of stainless steel rods 50. Suitable lock nuts 52 secure the rods 50 to the end plates in the manner illustrated.

As can best be seen in FIGS. 1 and 8, the rotisserie 10 further comprises a slider end plate 54 which has an enlarged aperture 56 with which is aligned a pillow block and rotating bronze ball assembly 58. The assembly 58 is secured to the slider end plate 54 by suitable fastening means, such as the bolt and nut assembly 59. The pillow block and rotating bronze ball assembly 58 receives the unslotted shaft 48 to rotatably support the right end of the cradle 26 for rotation about its longitudinal axis. The unslotted shaft 48 is secured to the ball assembly 58 by means of a shaft lock collar 79 and a set pin 81.

The slider end plate 54 is slidably received within the opposing slots 40 of the legs 36 so that the slider plate 54 and the cradle 26 carried thereby may be raised and lowered to one of a selected number of vertical positions. As can best be seen in FIGS. 1 and 8, this is accomplished by means of the lift adjustment lever 60 that has an end aperture 62 through which bolt 64 extends and is fastened to a threaded aperture 66 in the end plate assembly 30 in such a manner that the lever 60 is pivotally movable about the axis of the bolt 64. The lever 60 has a second aperture 68 through which a bolt 70 extends for securement to an aperture 72 in the slider plate 54. It can thus be seen that when the lever 60 is raised, it pivots about the bolt 64 and will raise the slider plate 54 upwardly. The slider plate 54 will be lowered when the lever 60 is lowered. A lock pin 74 is attached to the lever 60 by means of a suitable rope 76 to prevent loss of the lock pin 74. Lock pin 74 is adapted to be received in any one of a plurality of apertures 78 disposed in the left-hand leg 36 such that when the lock pin 74 is secured in one of the apertures 78 beneath the lever 60, further downward movement of the lever 60 and thus the slider plate 54 and the right end of the cradle 26 is prevented. If a lower position of the cradle 26 is desired, the pin 74 is removed and inserted into a lower aperture 78, permitting the lever 60 to be lowered. Likewise, if the lever 60 is raised above a higher aperture 78, the pin 74 may be placed therein and the position of the cradle 26 is then located as desired.

As can best be seen in FIGS. 2 and 3, the opposite side of the rotisserie 10 is provided with a similar mechanism for raising and lowering the cradle 26. The left side of the rotisserie 10 as viewed in FIG. 3 includes an L-shaped, motor slider end plate 80, the opposite vertical edges of the upright leg 83 being slidably received in the slots 38 of the vertical legs 34 such that the plate 80 may be raised and lowered in a manner to be described hereinafter. The upper end of the slider plate 80 includes an aperture 82 through which the slotted shaft 46 extends. A pillow block and rotating bronze ball assembly 84 is aligned with the aperture 82 and secured to the slider plate 80 by suitable means, such as the bolt and nut assembly 86. The pillow block and rotating bronze ball assemblies 58 and 84 permit the shafts 46 and 48 to be inclined with respect to the slider plates 54 and 80 while rotating the cradle 26. The slotted shaft 46 extends through the pillow block and rotating bronze ball assembly 84 and is supported thereby for rotation about its longitudinal axis. Secured to the end of the slotted shaft 46 is a cradle shaft drive sprocket 88. The drive sprocket 88 is secured thereto by means of a pin and a key (not shown) which engage the slotted portion of the shaft 46 in the conventional manner.

The lower leg 94 of the motor slider end plate 80 includes a plurality of apertures 96 through which suitable fasteners 98 (FIG. 2) will extend to attach an electric motor 100 thereto such that the electric motor is secured to the slider plate 80 and movable vertically therewith in a manner to be described. The motor 100 has an output shaft 102 onto which a motor drive sprocket 104 is secured by means of set pin and key (not shown). An appropriate chain 110 attaches the sprockets 104 and 88 such that the output drive shaft 102 of the electric motor 100 will drive the slotted shaft 46 of the cradle 26 whereby the cradle 26 may be rotated at a selected speed about its longitudinal axis.

Selected vertical positioning of the left end (as viewed in FIG. 3) of the cradle 26 may be had by means of a lift adjustment lever 112. Lift adjustment lever 112 is substantially identical to the lift lever 60 described hereinbefore and illustrated in FIG. 8 of the drawings. Accordingly, the components of the lever 112 are identified by the same numerals as that used to identify the lever 60. The right leg 34 (FIG. 3) is similarly provided with a plurality of apertures 78 which function to receive the pin 74 so as to be able to selectively position the lever 112 as previously described with respect to lever 60 and therefore control the vertical position of the shaft 46.

It can thus be seen that the rotating cradle 26 may be positioned at a plurality of horizontally disposed axes for rotation thereabout so that the meat carried within the cooking cradle 26 may be positioned at the desired height above the cooking element disposed within the grill pan 12. Similarly, the opposite shafts 46 and 48 may be disposed at different vertical heights so that the cooking cradle 26 may be inclined. Thus, different portions of the cooking cradle 26 may be disposed at different heights above the heating element within the grill pan 12. It should be noted that the electric motor 100 and the drive connection between the electric motor and the shaft 46 are carried by the slider plate 80 and therefore the motor 100 is vertically adjustable along with the shaft 46, thus simplifying the mechanical connection between the two elements.

Both levers 60 and 112 are provided with heat-resistant safety grips 114 (FIG. 3).

While only shown in FIGS. 3 and 6, the sprocket drive assembly is enclosed by a safety shield 116 that is secured to the lower leg 94 of the slider plate 80 by means of suitable fasteners 118.

It should be understood that the interior portions of the grill pan 12 may be provided with a number of conventional means for providing heat for cooking the food carried by the rotating cooking cradle 26. For example, charcoal, LP gas, or electrical means may be used.

Referring now to FIGS. 4, 5, 6 and 7, wherein there is disclosed a second embodiment of the present invention in the form of a rotisserie 120. The rotisserie 120 comrpises many of the components that make up the rotisserie 10 described hereinbefore. Accordingly, like components are designated by the same numerals and the description of such components as set forth hereinbefore is applicable to those similarly numbered components of the rotisserie 120, and no further description thereof is necessary. The primary difference between the rotisserie 120 and the rotisserie 10 is in the cooking cradle 122.

Figure 4:
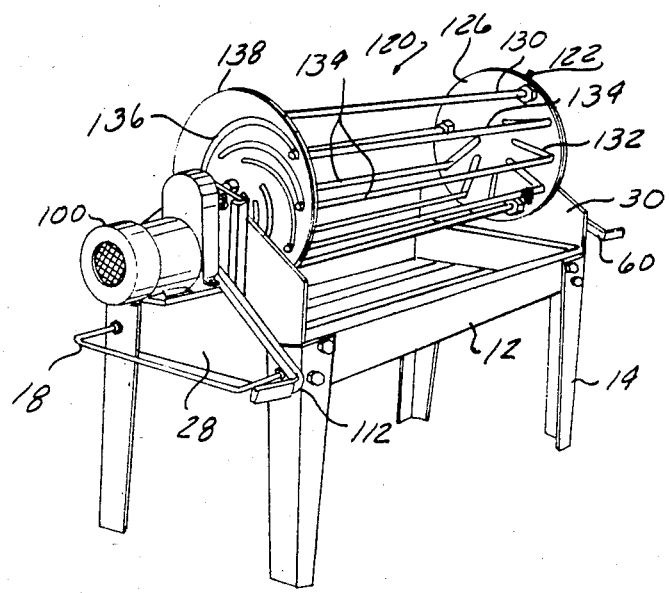
FIG. 4 is a left-end, perspective view of a second embodiment of applicant's invention in the form of a rotisserie.
Figure 5:
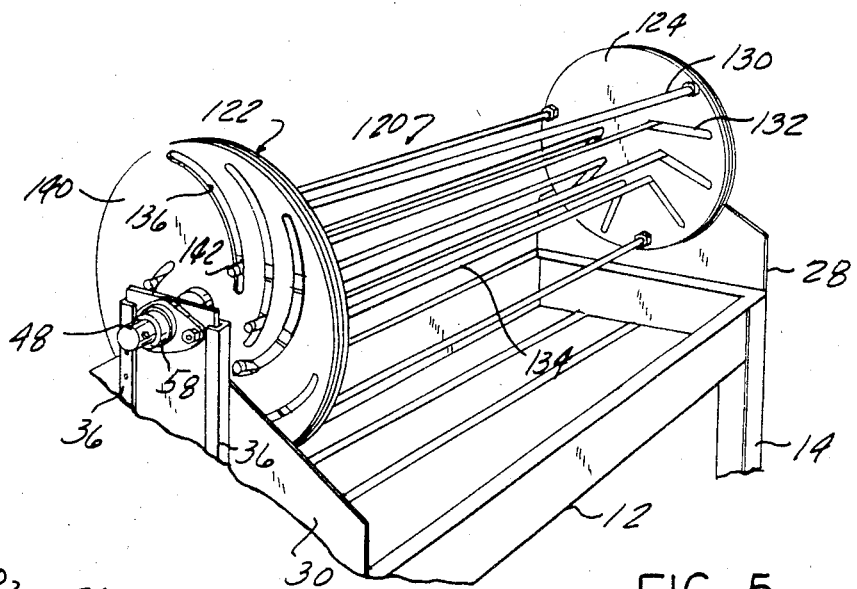
FIG. 5 is a perspective, rear view of the right end of the rotisserie illustrated in FIG. 4 with certain components omitted for clearity.

As can best be seen in FIGS. 4 and 6, the cooking cradle 122 comprises a pair of circular inner end plates 124 and 126 which are secured to each other at a fixed distance by means of stainless steel rods 130 that have threaded ends (unnumbered) that are secured to the end plates 124 and 126 by suitable nuts 128 that engage the opposite threaded ends of the rods 130. In the preferred embodiment three such rods 130 are employed to connect the inner end plates 126 and 128. The inner end plate 126, as seen in FIG. 5, has a shaft 48 secured thereto that is identical in function and operation as the shaft 48 described hereinbefore in that it extends through and is supported by a pillow block and rotating bronze ball assembly 58.

The inner end plate 124 similarly has a shaft 46 that extends through the upper leg 83 of the motor slider plate 80 and is rotatably carried by the pillow block and rotating bronze ball assembly 84. The shaft 46 carried by inner end plate 124 is also slotted and secured to the cradle shaft drive sprocket 88.

The end plates 124 and 126 each have a plurality of radial slots 132 that each receive one of a plurality of clamping rods 134. The opposite ends of each of the clamping rods 134 are threaded and extend through spiral slots 136 formed in each of a pair of outer end plates 138 and 140 where the opposite threaded ends of the rods 134 are engaged by a suitable fastener, such as a nut 142. Engagement of the nut 142 with the threaded ends of the rods 134 is loose enough to permit the rods 134 to move within the slots 132 and 136 as the inner and outer end plates are rotated relative to one another, as will be described hereinafter.

The outer end plates 138 and 140 each have a bushing 146, the internal bore of which rotatably receives the inner plate shafts 46 and 48 such that the inner and outer plates may be rotated relative to each other. As can best be seen in FIG. 7, when the outer plates 138 and 140 are rotated relative to the inner plates 124 and 126, the geometry of the spiral slots 136 and the radial slots 132 is such that the clamping rods 134 may be moved in toward the longitudinal axis of the cradle 122, as desired. If both outer plates are rotated the same amount, then the rods 134 at either end of the cradle 122 will move inwardly the same radial distance. Obviously, if the outer end plate 140 is rotated to a lesser angular amount with respect to the end plate 126 than is the end plate 138 rotated with respect to the end plate 124, the clamping rods 134 will be moved inwardly toward the longitudinal axis of the cradle along an incline. Thus, the clamping rods 134 can be disposed in a conical shape. This permits the rods 134 to be used to clamp a piece of meat which is desired to be retained by the cradle 122. As can best be seen in FIG. 6, the inner end plates 124 and 126 are provided with a plurality of circumferentially spaced apertures 150 which are selectively alignable with a single aperture 152 formed in the outer end plates 138 and 140 and through which a lock pin 154 may extend and engage one of the apertures 150 so as to lock the inner and outer plates at any one of a selected number of relative angular positions.

Figure 9:
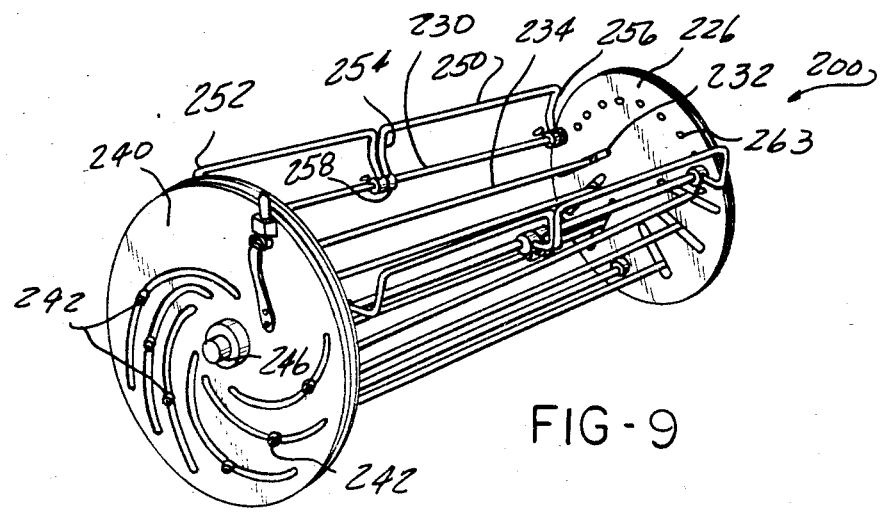
FIG. 9 is a left-end, perspective view of a third embodiment of the invention in the form of a modification of the cradle illustrated in FIGS. 4–8.
Figure 10:
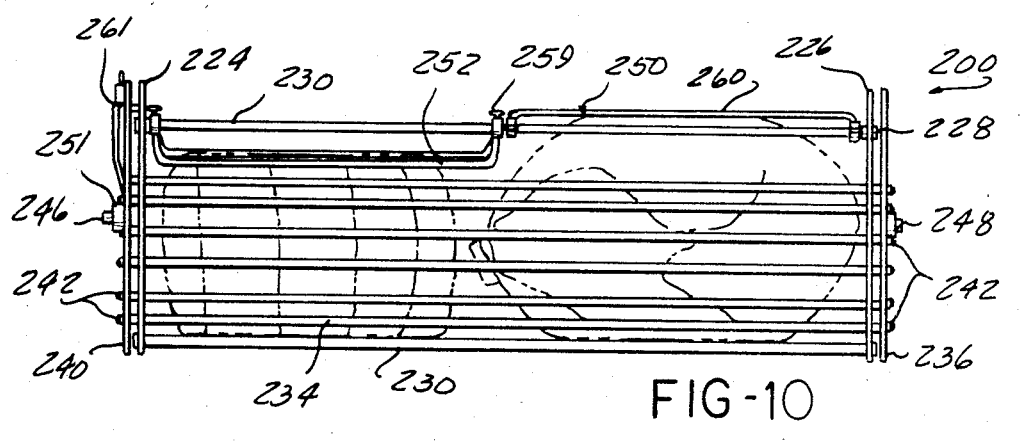
FIG. 10 is a front elevational view of the cradle illustrated in FIG. 9 with different sized meats secured therein.
Figure 11:
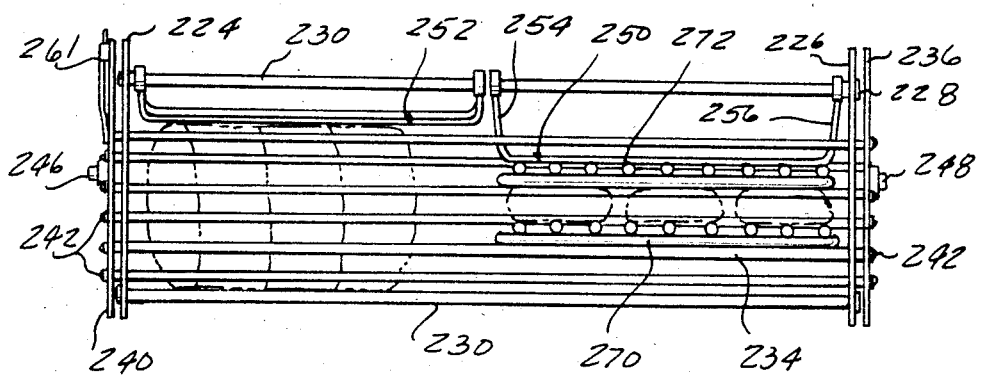
FIG. 11 is a front elevational view of the cradle illustrated in FIG. 9 with a grill for securing small amounts of meat.

Referring now to FIGS. 9, 10 and 11 wherein there is disclosed a third embodiment of the present invention in the form of a cradle 200. The cradle 200 has substantially the same construction and is used in the same manner as the cradle 122 described hereinbefore in the description of FIGS. 4–7. The cradle 200 comprises a pair of circular inner end plates 224 and 226 which are secured to each other at a fixed distance by means of stainless steel rods 230 that have threaded ends that are secured to the inner end plates 224 and 226 by suitable nuts 228 that engage the opposite threaded ends of the fixed steel rods 230. The inner end plate 226 is provided with a shaft 248 that is identical in function and operation as the shaft 48 described hereinbefore, and therefore no further description thereof is necessary. The inner end plate 224 similarly has a shaft 246 that is adapted to extend through the upper leg 83 of the motor slider plate 80, in the same manner as described hereinbefore.

The inner end plates 224 and 226 each have a plurality of radial slots 232 which, in turn, receive one of a plurality of clamping rods 234. The opposite ends of each of the clamping rods 234 are threaded and extend through the spiral slots 236 formed in each of a pair of outer end plates 238 and 240, such that the opposite threaded ends of the clamping rods 234 are engaged by suitable fasteners, such as nuts 242. The engagement of the nuts 242 with the threaded ends of the clamping rods 234 is loose enough to permit the rods 234 to move within the slots 232 and 236 as the inner and outer end plates are rotated relative to each other in the manner described hereinbefore with respect to the rotisserie cradle 122. The outer end plates 238 and 240 each have a bushing 251, the internal bore of which rotatably receives the inner end plate shafts 246 and 248 such that the inner and outer plates may be rotated relative to each other.

In a manner similar to that described hereinbefore, when the outer end plates 238 and 240 are rotated relative to the inner end plates 224 and 226, the geometry of the spiral slots 236 and the radial slots 232 is such that the clamping rods 234 will be moved in toward the longitudinal axis of the cradle 200 to any desired radial position. If both the outer plates are rotated the same amount, then the rods 234 at either end of the cradle 200 will move inwardly the same radial distance. Obviously, if the outer end plate 240 is rotated to a lesser angular amount with respect to the inner end plate 224 than is the outer end plate 238 rotated with respect to the end plate 226, the clamping rods 234 will be moved inwardly toward the longitudinal axis of the cradle along an incline. Thus, the clamping rods 234 can be disposed in a conical shape. This permits the rods 234 to be used to clamp any size piece of meat which is desired to be retained within the cradle 200. The relative movement between the inner and outer end plates is controlled by spring biased pin 261 which is selectively received in one of a plurality of arcuately spaced apertures 263.

As can best be seen in FIG. 9, the steel rods 230 are disposed at selected positions along the circumference of the inner end plates 224 and 226 so as to define an opening through which the meats to be cooked may be inserted into the interior of the cradle 200 between the fixed steel rods 230 and the movable clamping rods 234. The two fixed steel rods 230 adjacent the cradle opening are each provided with longitudinally aligned, U-shaped clamping members 250 and 252. As all four disclosed clamping members are identical, only one will be described in detail; however, its description is equally applicable to the others. Clamping rod 252 is U-shaped with its legs 254 and 256 terminating in bushings 258 which are rotatably mounted on the steel rods 230. Each of the bushings is provided with a radial aperture into which is threaded a thumb screw 259. It is obvious that the pivotal movement of the clamping members 250 and 252 about their associated steel rods 230 permits clamping members 250 or 252 to be rotated from the opened position illustrated in FIG. 9 inwardly toward the longitudinal center of the cradle 200 until the longitudinal portions 260 of the clamping members 250 or 252 abuttingly engage the meat disposed within the cradle, such as illustrated in FIG. 10. When a larger piece of meat, as illustrated on the right side of cradle 200 in FIG. 10, is disposed within the cradle, the clamping member 250 will engage the same at a higher position than such as is illustrated on the left-side of FIG. 10 when the clamping member 252 engages a smaller piece of meat at a lower position. When the clamping member portion 260 engages the meat to secure the same within the confines of the cradle and the cradle clamping rods have been positioned in locking engagement with the peripheral surface of the meat as described hereinbefore, thumb screws 259 associated with each clamping member bushing 258 may be tightened to lock the clamping members 250 and/or 252 in position and secure the meat within the cradle. It is obvious that while each support or steel rod 230 is shown having a pair of longitudinally aligned clamping members that one large clamping member may be substituted therefor extending the full length of the rod 230.

In FIG. 11 there is illustrated a pair of grate members 270 and 272 which are adapted to support small pieces of meat, such as hamburger patties or hot dogs. The lower grate member 270 is positioned on a clamping rod 234 and a plurality of small portions of meat are placed thereon. A second grate member 272 is positioned on top of the meat and the clamping members 250 are swung down to a lower position engaging the grate member 272 to secure the meat therebetween.

It can thus be seen that applicant has disclosed a new and improved rotisserie which overcomes the disadvantages of the prior art rotisseries, and it should be understood by those skilled in the art of such rotisseries that other forms of applicant's invention may be had, all coming within the scope and spirit of the appended claims.

What is claimed is:

1. A cradle for a rotisserie, said cradle comprising:
a pair of longitudinally spaced, opposite end plates;
shaft means extending longitudinally outwardly from each of said end plates;
a plurality of longitudinally extending and circumferentially spaced rods fixedly secured to said end plates;
a pair of adjacent rods being circumferentially spaced from each other a sufficient distance to define a longitudinal opening for the passage of food into the interior of said cradle;
a U-shaped member having a pair of legs; and
means pivotally securing said legs to one of said adjacent rods such that said member is pivotable about the longitudinal length of said one rod to open and close said longitudinal opening.

2. The cradle defined in claim 1 wherein each of said spaced adjacent rods carries a U-shaped clamping member, the clamping members being so sized as to each occupy half of the opening of said cradle.

3. The cradle defined in claim 2 wherein each of said adjacent rods is provided with a pair of said clamping members, each pair being successively located along the length of its associated adjacent rod.

4. A rotisserie comprising:
first and second spaced supporting frames;
a cradle for supporting food to be cooked, said cradle comprising:
a pair of longitudinally spaced, opposite end plates;
shaft means extending longitudinally outwardly from each of said end plates;
first and second support means respectively carried by said first and second support frames, said first and second support means each being independently movable from a vertical adjustment of said frames, each of said shaft supporting means having self-alignment bearings rotatably supporting said shafts;
means for rotating at least one of said shafts whereby said cradle may be positioned at selectively different vertical positions with respect to said frame to rotate said frame about a selected axis;
a plurality of longitudinally extending and circumferentially spaced rods fixedly secured to said end plates;
a pair of adjacent rods being circumferentially spaced from each other a sufficient distance to define a longitudinal opening for the passage of food into the interior of said cradle;
a U-shaped member having a pair of legs; and
means pivotally securing said legs to one of said adjacent rods such that said member is pivotable about the longitudinal length of said one rod to open and close said longitudinal opening.

5. The rotisserie defined in claim 4 wherein said first and second support means may be vertically positioned such that said cradle may be rotated about an inclined axis.

6. The rotisserie defined in claim 4 wherein said means for rotating said cradle shafts is carried by one of said shaft support means and is vertically movable therewith.

7. The rotisserie defined in claim 4 wherein said first and second shaft support means each comprises:
- a pair of vertically disposed legs each having a vertical groove disposed therein in opposing relationship;
- a slider plate disposed in said opposing grooves for vertical movement, the upper end of said slider plate supporting said bearing means;
- a lever having an end portion pivotally mounted to the supporting frame associated with said legs, a central portion being pivotally connected to said slider mechanism such that said slider mechanism can be raised and lowered as said lever is raised and lowered and pivoted about said first pivotal point; and
- means for locking said lever at selected vertical locations.

8. A cradle for supporting food to be cooked, said cradle comprising first and second opposite end plates;
- fixed rods connecting said end plates together and shaft means extending longitudinally outwardly from said end plates, said end plates each having a plurality of radially disposed slots;
- a first control plate rotatably mounted on the shaft means associated with said first end plate and outside of said first end plate;
- a second control plate rotatably mounted on said shaft means associated with said second end plate and outside of said second end plate; said first and second control plates each having a plurality of spiral-shaped slots;
- a plurality of longitudinally disposed clamping rods, each rod extending through one radial slot in each end plate and one spiral slot in each control plate and movable within said slots as said plates are rotated with respect to each other such that the radial and angular position of said clamping rods with respect to the longitudinal axis of said shaft means may be selectively and independently varied across the length of the cradle;
- a plurality of longitudinally extending and circumferentially spaced rods fixedly secured to said end plates;
- a pair of adjacent rods being circumferentially spaced from each other a sufficient distance to define a longitudinal opening for the passage of food into the interior of said cradle;
- a U-shaped member having a pair of legs; and
- means pivotally securing said legs to one of said adjacent rods such that said member is pivotable about the longitudinal length of said one rod to open and close said longitudinal opening.

9. A rotisserie comprising:
first and second spaced supporting frames;
a cradle for supporting food to be cooked, said cradle having first and second opposite end plates;
fixed rods connecting said end plates together and shaft means extending longitudinally outwardly from said end plates, said end plates each having a plurality of radially disposed slots;
shaft support means carried by said supporting frames for rotatably supporting said shafts;
a first control plate rotatably mounted on the shaft means associated with said first end plate between said first end plate and one of said frames;
a second control plate rotatably mounted on said shaft means associated with said second end plate between said second end plate and the other of said frames, said first and second control plates each having a plurality of spiral-shaped slots;
a plurality of longitudinally disposed clamping rods, each rod extending through one radial slot in each end plate and one spiral slot in each control plate and movable within said slots as said plates are rotated with respect to each other such that the radial and angular position of said clamping rods with respect to the axis of rotation of each of said shafts may be selectively and independently varied across the length of the cradle;
a plurality of longitudinally extending and circumferentially spaced rods fixedly secured to said end plates;
a pair of adjacent rods being circumferentially spaced from each other a sufficient distance to define a longitudinal opening for the passage of food into the interior of said cradle;
a U-shaped member having a pair of legs; and
means pivotally securing said legs to one of said adjacent rods such that said member is pivotable about the longitudinal length of said one rod to open and close said longitudinal opening.

10. The rotisserie defined in claim 9 wherein said first and second support means may be vertically positioned such that said cradle may be rotated about an inclined axis.

11. The rotisserie defined in claim 9 wherein said means for rotating said cradle shafts is carried by one of said shaft support means and is vertically movable therewith.

12. The rotisserie defined in claim 9 wherein said first and second shaft support means each comprises:
- a pair of vertically disposed legs each having a vertical groove disposed therein in opposing relationship;
- a slider plate disposed in said opposing grooves for vertical movement, the upper end of said slider plate supporting said bearing means;
- a lever having an end portion pivotally mounted to the supporting frame associated with said legs, a central portion being pivotally connected to said slider mechanism such that said slider mechanism can be raised and lowered as said lever is raised and lowered and pivoted about said first pivotal point; and
- means for locking said lever at selected vertical locations.

13. The rotisserie defined in claim 9 further comprising:
first and second support means respectively carried by said first and second support frames, said first and second shaft support means each being independently movable for vertical adjustment on said frames, each of said shaft supporting means having self-alignment bearings rotatably supporting said shafts; and means for rotating at least one of said shafts whereby said cradle shafts may be positioned at selectively different, vertical positions with respect to said frame to rotate said frame about a selected axis.

14. The rotisserie defined in claim 13 wherein said first and second support means may be vertically positioned such that said cradle may be rotated about an inclined axis.

15. The rotisserie defined in claim 13 wherein said means for rotating said cradle shafts is carried by one of said shaft support means and is vertically movable therewith.

* * * * *